(No Model.)  2 Sheets—Sheet 1.

C. W. RICH.
Vibrating Propeller.

No. 240,765.   Patented April 26, 1881.

WITNESSES:
Chas. Nida.
C. Sedgwick

INVENTOR:
C. W. Rich
BY Munn & Co.
ATTORNEYS.

N. PETERS, PHOTO-LITHOGRAPHER, WASHINGTON, D. C.

(No Model.) 2 Sheets—Sheet 2.
C. W. RICH.
Vibrating Propeller.
No. 240,765. Patented April 26, 1881.
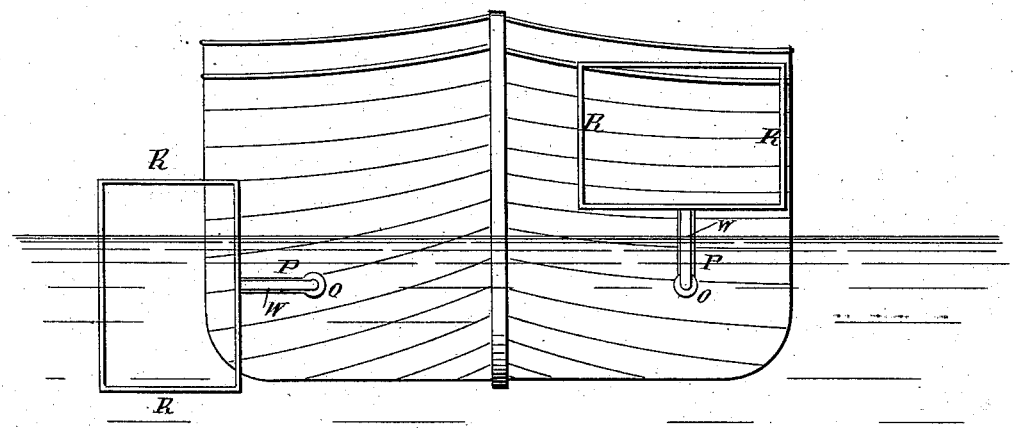
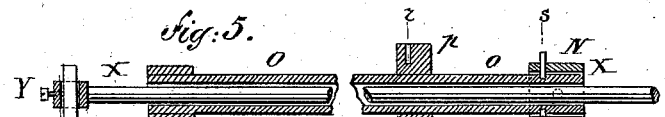
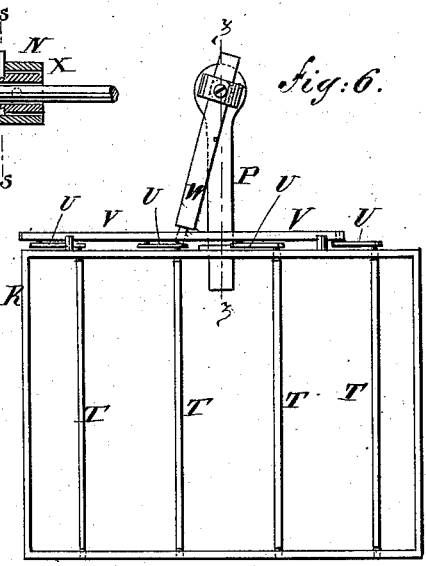
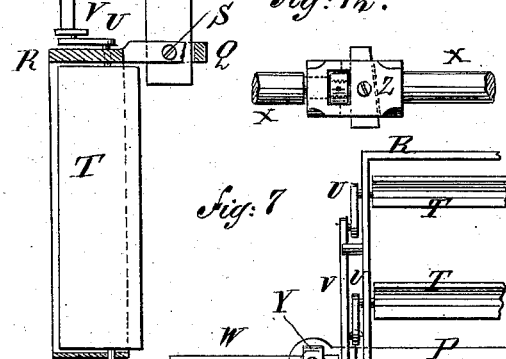
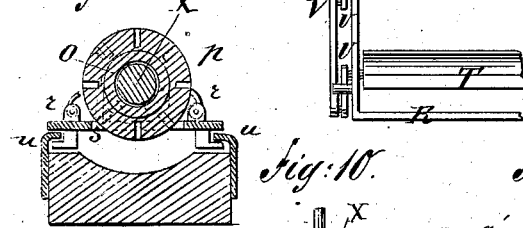
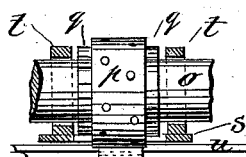
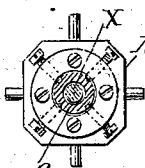
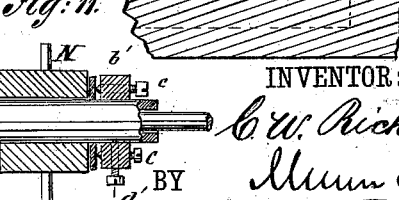
WITNESSES:
Chas. Nida.
C. Sedgwick.
INVENTOR:
C. W. Rich
BY Munn & Co
ATTORNEYS.

UNITED STATES PATENT OFFICE.

CHARLES W. RICH, OF WHITEHALL, NEW YORK.

VIBRATING PROPELLER.

SPECIFICATION forming part of Letters Patent No. 240,765, dated April 26, 1881.

Application filed February 21, 1881. (No model.)

*To all whom it may concern:*

Be it known that I, CHARLES WARREN RICH, of Whitehall, in the county of Washington and State of New York, have invented certain new and useful Improvements in Vibrating Propellers, of which the following is a specification.

Figure 1:
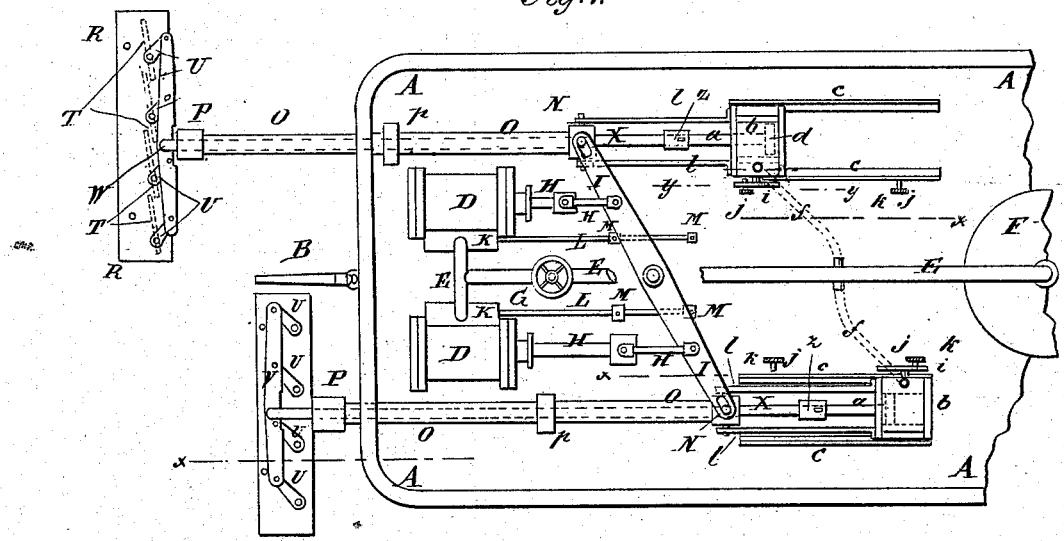
Figure 2:
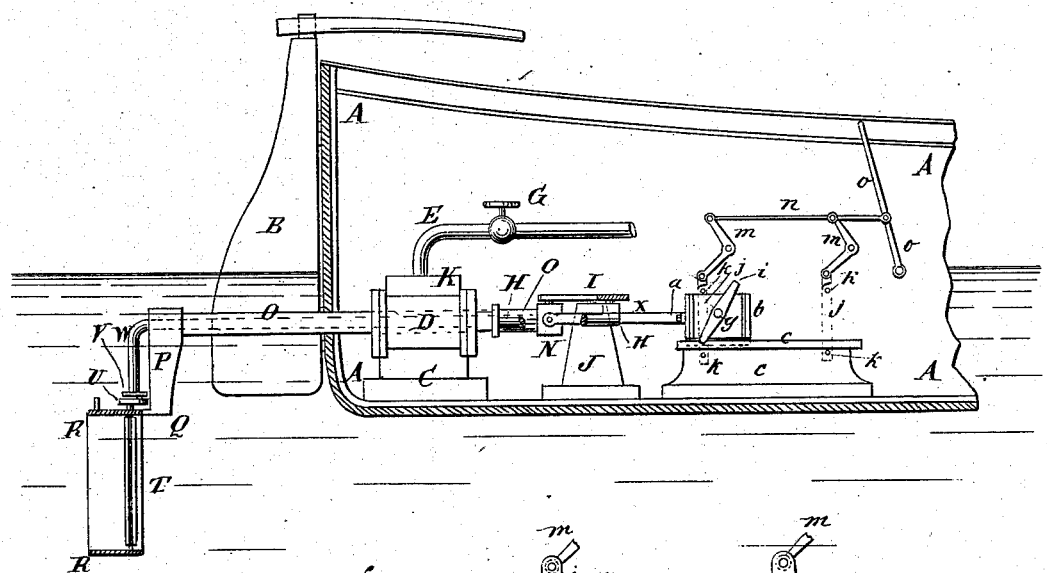
Figure 3:
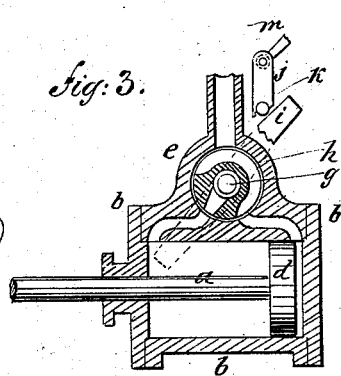

Figure 1, Sheet 1, is a plan view of my improvement. Fig. 2, Sheet 1, is a sectional side elevation of the same, taken through the line $x\ x\ x$, Fig. 1. Fig. 3, Sheet 1, is a sectional elevation of the steam-cylinder for changing and reversing the paddles, taken through the line $y\ y$, Fig. 1. Fig. 4, Sheet 2, is a rear elevation of a canal-boat to which my improvement has been applied, showing the paddle-frames in two positions. Fig. 5, Sheet 2, is a sectional elevation of one of the paddle-frames and its hollow shaft, taken through the line $z\ z$, Fig. 6. Fig. 6, Sheet 2, is a rear elevation of one of the paddle-frames and its attachments. Fig. 7, Sheet 2, is a rear elevation of a part of the paddle-frames swung into a side position and drawn toward the shafts. Fig. 8, Sheet 2, is a sectional elevation of the windlass-drum and the shafts, taken through the line $r\ r$, Fig. 5. Fig. 9, Sheet 2, is a side elevation of the same. Fig. 10, Sheet 2, is a sectional elevation of the working collar and shafts, taken through the line $s\ s$, Fig. 5. Fig. 11, Sheet 2, is a side elevation of a part of the shafts, showing the working-collar in section. Fig. 12 is a plan view of the swiveled coupling.

Similar letters of reference indicate corresponding parts.

The object of this invention is to facilitate the application of steam-power to canal-boats and other vessels, and to adapt the propelling apparatus for use in deep water and in shallow water.

The invention consists in the combination, with the steam-engine, the pivoted paddles, and their frame, of the walking-beam, the tubular shaft, the interior shaft, the supplementary steam-engine and the paddle-cranks and their connecting-bar, whereby the paddles are operated and their positions are changed at each end of each stroke; also, in the combination, with the tubular shaft, the interior shaft, and the paddle-frame and its attachments, of the adjustable arms, whereby the paddle-frame and its attachments can be adjusted closer to and farther from the said shafts; and, also, in the combination, with the tubular shaft, of the windlass-drum, the ratchet-wheels, and pawls, and the sliding frame, whereby the said tubular shaft can be turned to swing the paddles below the level of the keel to the side of the vessel and above the water without interfering with the longitudinal movement of the shafts, all constructed and operating as will be hereinafter fully described.

A represents the hull of a canal-boat, which is provided with a rudder, B, in the ordinary manner.

Within the hull A, upon suitable beds C, are secured two steam-cylinders, D, with which is connected the branched end of a steam-pipe, E, leading to the steam-boiler F, and provided with a valve, G, in the ordinary manner.

The piston-rods H of the cylinders D are jointed, and are connected with the opposite arms of the horizontal walking-beam I, which is pivoted midway between the piston-rods H to a support, J, attached to the frame of the vessel.

K are the steam-chests of the cylinder D, the valve-stems L of which project and have collars M or other stops secured to them adjustably by set-screws or other suitable means in such positions that the said stops will be struck by the walking-beam I as it oscillates to admit and shut off steam.

The ends of the walking-beam I are slotted to receive the pivots that connect the said ends to the loose collars N, which are connected to the inner ends of the hollow or tubular shafts O, so that the said hollow shafts can be turned without affecting the connection between the collars N and the walking-beam I. The collars N are held between small collars $a'$, fixed on shafts, and adjustable collars $b'$, that are held to the shafts by screws $d'$. There are screws $c'$ tapped in collar $b'$ and taking against collar N, for taking up wear between the beam I and collars N.

The tubular shafts O pass out through stuffing-boxes in the side parts of the stern of the vessel A, and to their outer ends are rigidly attached or upon them are formed arms P, projecting at right angles with the said tubular shafts O. The crank-arms P are flattened in the direction of the shafts O, and pass through slots in the arms Q formed upon or attached to the center of the top bars of the paddle-frames R, and projecting at right angles with the said frames R and parallel with the tubular shafts O.

The crank-arms P are secured to the slotted arms Q by set-screws S, or other suitable means, so that the paddle-frames R may be adjusted nearer to or farther from the tubular shafts O, as circumstances may require. In some cases the crank-arms P may be permanently connected with the paddle-frame arms Q, as shown in Fig. 2.

Within each frame R are placed four, more or less, paddles, T, which are pivoted a little at one side of the centers of their ends to the said frames R in such positions that when the said paddles T are turned parallel with the frames R their adjacent edges will overlap. The upper journals of the paddles T project, and to them are rigidly attached short crank-arms U at an angle of about forty-five degrees (45°) with the said paddles T.

To the outer ends of the crank-arms U is pivoted a connecting bar or lever, V, to the center of which is rigidly attached an arm, W, which passes through a hole in the end of the shaft X, where it is secured in place by a set-screw, Y, or other suitable means, to allow the paddle-frame R to be adjusted closer to or farther from its shaft.

In case the crank-arm P is permanently connected with the arm Q, the arm W may be permanently connected with or formed upon the shaft X.

With this construction the paddles T can be adjusted parallel with the frames R to act upon the water, or at right angles with the said frames R to pass edgewise through the water, by the longitudinal movement of the shaft X.

The shaft X passes through the interior of the tubular shaft O, and its other end is swiveled, by a suitable coupling, Z, to the end of the piston-rod $a$ of the small steam-cylinder $b$. The cylinder $b$ is mounted and slides upon a way, $c$, and is connected with the swiveled collar N by bars $l$, as shown in Fig. 1, so that it will travel with the shafts O X. The cylinder $b$ is made of such a length that the movement of its piston $d$ will slide the shaft X the exact distance to open and close the paddles T.

The steam enters the steam-chest $e$ of the cylinder $b$ through a flexible pipe, $f$, of rubber or other suitable material, one end of which is connected with the said steam-chest $e$, and its other end is connected with the steam-pipe E.

To the stem $g$ of the valve $h$ is rigidly attached the middle part of the cross-bar $i$.

In guides attached to the way $c$ or other suitable support slide bars $j$, to the upper and lower parts of which are attached projecting pins $k$ or other suitable stops. The two stops $k$ of each bar $j$ are at such a distance apart that when either stop is in position to be struck by an end of the cross-bar $i$ the other stop will be out of the sweep of the said cross-bar $i$. The bars $j$ are so placed that the cross-bar $i$ will strike a stop, $k$, at the end of each movement of the cylinder $b$ and shafts O X, and shift the valve $h$ to admit steam to the other side of the piston $d$ and force the said piston $d$ to the other end of the said cylinder $b$. The piston $d$ in this movement carries the shaft X with it, and opens or closes the paddles T, according to the direction of the said movement.

When it is desired to stop or back the vessel the bars $j$ are moved to bring the other stops $k$ into position to be struck by the other end of the cross-bar $i$ to reverse the movement of the piston $d$, and thus reverse the opening and closing of the paddles T, and the direction in which the propelling power is applied to the water.

The upper ends of the bars $j$ are pivoted to the lower arms of the angle-levers $m$, which are pivoted at their angles to the frame of the vessel or other suitable supports.

The upper arms of the angle-levers $m$ are pivoted to and connected by a bar, $n$, to which is pivoted a lever, $o$. The lever $o$ is pivoted to the frame of the vessel or other suitable support in such a position that it can be readily reached and operated by the engineer to reverse the motion when desired.

When the vessel is sailing in deep water the shaft O can be turned, carrying the shaft X with it, to turn the paddle-frame R and paddles T downward, bringing the upper bar of the said paddle-frame R about upon a level with the keel of the vessel, as shown in Fig. 2. When the vessel is sailing in shallow water the paddle-frame R and paddles T can be turned outward, bringing the lower bar of the said paddle-frame about upon a level with the keel of the vessel, as shown in the left-hand part of Fig. 4. When the paddle-frames R and paddles T are in either of these two positions they can be moved toward or from the vessel, as circumstances may require, by loosening the set-screws or other fastenings that secure the arms P Q to each other and the arm W to the end of the shaft X, as hereinbefore described.

Should the paddles T become clogged with weeds or other rubbish, the paddle-frames R can be turned upward, bringing the said paddle-frames and the paddles above the surface of the water, as shown in the right-hand part of Fig. 4, so that the obstruction can be conveniently removed, and the paddles and paddle-frames cleaned from a boat.

I will now describe the mechanism by means of which the shaft O is turned to effect these various purposes.

To the shaft O is attached a windlass-drum, $p$, which has a number of holes formed in it to receive the levers or bars by means of which it is turned to turn the shaft O. Upon the ends of the drum $p$ are attached ratchet-wheels $q$, the teeth of which point in opposite directions and engage with pawls $r$, so that the drum $p$ and the shaft O and its attachments will be held securely in any position into which they may be adjusted. The pawls $r$ are pivoted to a cross-head frame, $s$, in bearings $t$ attached to which the shaft O revolves. The frame $s$ slides in ways $u$ attached to a frame or other support secured to the frame of the vessel. The bearings $t$ are placed at the opposite ends of the drum $p$, so that the shaft O will carry the cross-head frame $s$ with it in its longitudinal movement. By this construction the cross-head frame $s$ supports the part of the shaft O to which the drum $p$ is attached, so that the said shaft will not be sprung by the strain applied to the said drum $p$.

Having thus fully described my invention, I claim as new and desire to secure by Letters Patent—

1. In a vibrating propeller, the combination, with the steam-engine D H, the pivoted paddles T, and their frame R, of the walking-beam I, the tubular shaft O, the interior shaft, X, the supplementary steam-engine $b$ $d$ $a$, the connecting-bar V, and the crank-arms U, substantially as herein shown and described, whereby the paddles are operated and their positions are changed at each end of each stroke, as set forth.

2. In a vibrating propeller, the combination, with the tubular shaft O, the interior shaft, X, and the paddle-frame R, and its attachments, of the adjustable arms P Q W, substantially as herein shown and described, whereby the paddle-frame and its attachments can be adjusted closer to and farther from the shafts O X, as set forth.

3. In vibrating propellers, the combination of the tubular and propeller shafts O X, the cross-head frame $s$, and the drum $p$, having ratchet-wheels $q$, the teeth of said wheels being arranged in opposite directions and engaging with pawls $r$, as and for the purpose specified.

CHARLES WARREN RICH.

Witnesses:
EDWIN J. BALDWIN,
EUGENE CULVER.